Patented July 25, 1939

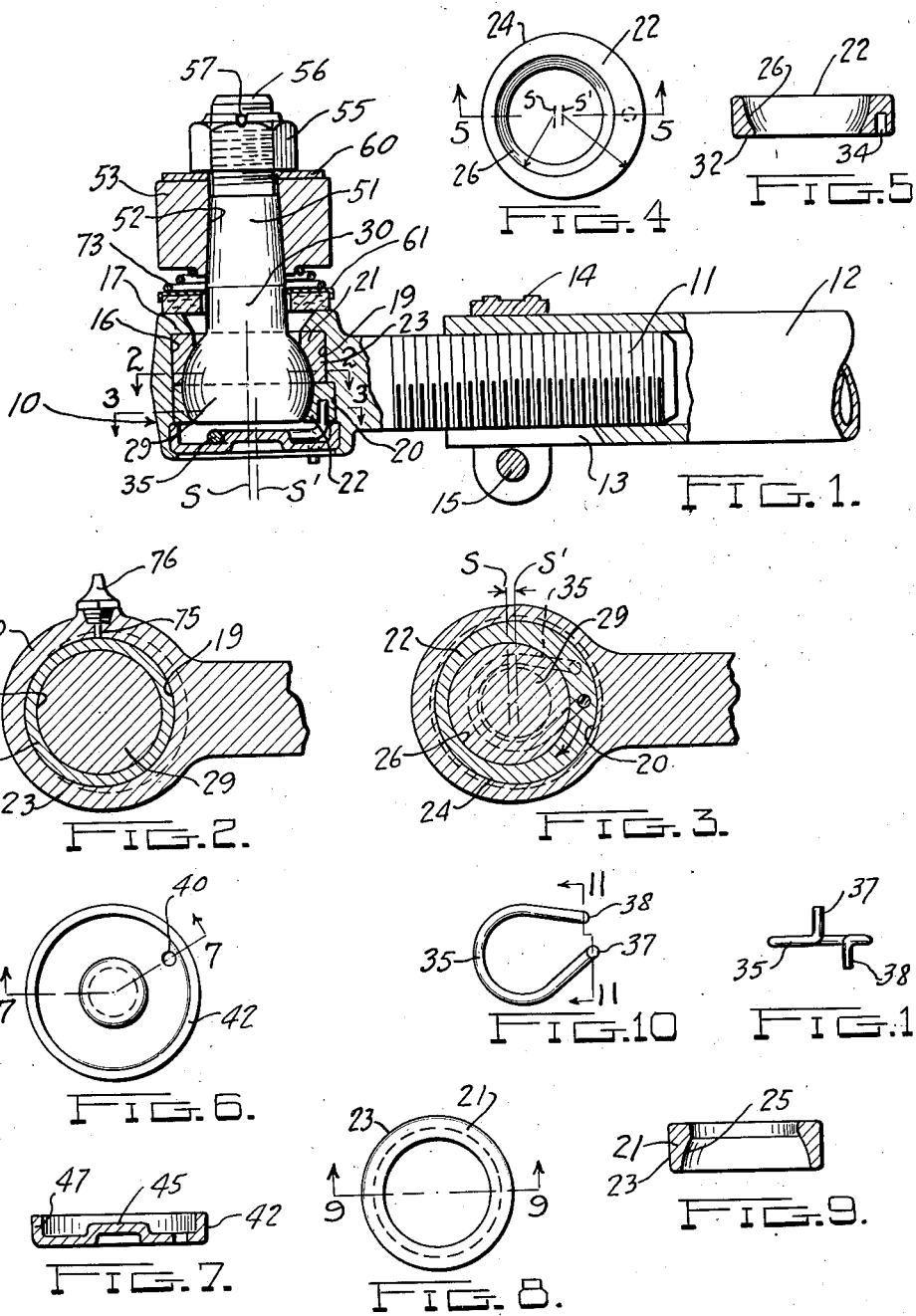

2,167,174

UNITED STATES PATENT OFFICE 2,167,174

JOINT

William A. Flumerfelt, Columbus, Ohio, assignor to The Columbus Auto Parts Company, Columbus, Ohio, a corporation of Ohio Application August 18, 1937, Serial No. 159,739

3 Claims. (Cl. 287—90)

This invention relates to joints and more particularly to joints of the ball and socket type including an arrangement which automatically compensates for wear of the parts, the joint being especially adapted for use in tie rods and drag link installations of automotive vehicles.

The invention is inclusive of a housing for a ball stud formed with wall portions having spaced centers of curvature one of which is located in the longitudinal axis of the stud and the other adjacent thereto and bearing surfaces coacting with said housing wall portions for automatically compensating for wear caused by oscillation and rotation of the ball stud.

An object of the invention resides in the provision of an effective and efficient ball joint wherein a plurality of bearing elements are so mounted as to automatically compensate for wear yet provides a joint structure which is extremely small in over-all dimension and which may be inexpensively manufactured.

Another object of the invention resides in a joint construction wherein bearing members are interposed between the housing and ball stud, the bearing members being provided with curved portions having different centers of curvature forming eccentrically arranged bearing surfaces and being provided with resilient means to cause movement of said surfaces for the purpose of compensating wear caused by oscillation and rotation of the ball stud.

A further object of the invention resides in the provision of at least a pair of bearing seats for the ball stud coacting with housing walls, one of which has a center of curvature in alignment with the axis of the ball stud while the center of curvature of the other is spaced therefrom, the bearing seats being so arranged in the housing that rotative movement is imparted to one with respect to the housing for the purpose of compensating for wear in a lateral direction and especially in the equatorial region of the ball stud.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational sectional view of the joint structure of my invention;

Figure 2 is a horizontal sectional view taken substantially on the line 2—2 of Figure 1;

Figure 3 is a horizontal sectional view taken substantially on the line 3—3 of Figure 1;

Figure 4 is a top plan view showing an eccentric bearing seat forming an element of my invention;

Figure 5 is a vertical sectional view taken substantially on the line 5—5 of Figure 4;

Figure 6 is a top plan view of a closure forming a part of the joint construction;

Figure 7 is a sectional view taken substantially on the line 7—7 of Figure 6;

Figure 8 is a plan view of a concentric bearing element forming a part of the invention;

Figure 9 is a section taken substantially on the line 9—9 of Figure 8;

Figure 10 is a top plan view of a spring means forming a part of the invention;

Figure 11 is an elevational view of the spring shown in Figure 10.

Referring to the drawing in detail and particularly to Figure 1, the joint construction has been illustrated as including a housing 10 provided with an integral laterally extending threaded tenon 11. The tenon 11 is received by the extremity of the tie rod 12 which is preferably hollow and interiorly threaded in order to provide adjustable means for connecting the tie rod to the housing. The side wall adjacent the end of the tie rod 12 is split as at 13 and is surrounded by a clamp or collar 14, the ends of which may be drawn together by means of a bolt 15 and a nut (not shown) in order to hold the tie rod in adjusted position with respect to the threaded tenon 11.

The housing 10 comprises the stud receiving chamber 16 which is in the form of an opening extending substantially transversely with respect to the longitudinal axis of the projecting tenon 11 and is provided with an inwardly extending flange or end portion 17. One of the features of the invention resides in the configuration of the walls of the stud receiving chamber including curved sections having different centers of curvature. In the form shown, the chamber 16 comprises cylindrical sections 19 and 20 having spaced centers and being generated about axes S and S' providing wall sections forming bores having an eccentric relationship. The chamber 16 is adapted to receive bearing elements conforming to the wall sections and having an inner surface adapted to snugly receive the portion of the stud associated therewith. In the form of the invention shown, two annular bearing elements 21 and 22 are illustrated. The bearing element 21 is formed with an outer surface 23 which conforms with the cylindrical section 19 of the chamber 16, while the outer surface 24 of the bearing element 22 conforms with the cylindrical section 20 of the chamber 16. The inner surface 25 and 26 of each of the bearing elements or seats 21 and 22 is curved to conform with the substantially spherically shaped or ball portion 29 of the stud 30 for snug engagement therewith.

As particularly shown in Figures 1, 8 and 9, the bearing member 21 is so constructed that the axis of curvature of its outer cylindrical surface 23 coincides with the longitudinal axis of the stud and its inner spherically curved surface 25 is symmetrically or centrally positioned with respect thereto whereby the bearing member 21 is of a substantially uniform cross section. The bearing member 21 is preferably of a proper width so as to have one end in engagement with the inner surface of flange 17 and its other end terminating substantially on the equatorial region of the spherical portion 29 of the stud 30.

The lower bearing member 22 as shown in Figures 1, 4 and 5, is formed so that its outer cylindrical surface 24 is generated on an axis S' spaced from the longitudinal axis S of the stud 30 as well as the axis of the cylindrical outer surface 23 of the upper bearing member 21. Thus the outer surface 24 of the bearing member 22 is eccentric with respect to its substantially spherically shaped inner surface 26 and with respect to the center of curvature of the ball shaped portion 29 of stud 30. The bearing member 22 contacts with the bearing member 21 providing a bearing surface for the lower end section of the ball shaped portion 29, and its lower horizontal surface 32 is provided with an opening 34 for the purpose of receiving one end of a resilient torsional member or spring 35.

The torsion spring or resilient member 35 as particularly shown in Figures 10 and 11 is of a substantially U-shaped configuration having its end portions 37 and 38 bent in opposite vertical directions. The end portion 37 of spring 35 is adapted to be received in the opening 34 of the lower bearing member 22 while the end portion 38 is adapted to be received in the opening 40 formed on a disc like member 42 fixedly secured to the lower open end of the chamber 16 as particularly illustrated in Figures 6 and 7. The disc like member or closure 42 is formed with a central raised portion 45, and with an upturned flange 47 adapted to engage the lower horizontal surface of the bearing member 22, acting as means to retain the bearing member 22 into contact with the bearing member 21 and the latter with the inner wall of the flange 17, whereby vertical displacement of the bearing members with respect to the housing is prevented. The closure 42 is held in position in the stud chamber 16 against longitudinal and rotative movement with respect thereto by swaging or otherwise fixedly securing the same lower end of the housing. The U-shaped torsional member 35 is located between bearing 22 and closure 42 and is positioned as to surround the raised portion 45 of the closure 42. This particular arrangement of the torsion spring 35 with respect to the housing and bearing 22 provides means whereby the same is placed under tension. Therefore the spring 35 exerts a rotative force on the bearing member 22 in a clockwise direction as indicated by the arrow of Figure 3, so that the latter is caused to wedgingly engage the ball stud at the most effective area and in this manner compensating for any possible wear of the bearing surface caused by the oscillation as well as the rotative movement of the stud and at the same time provide a uniform frictional component between the contacting bearing surfaces and ball stud.

The stem 30 of the ball stud is preferably slightly tapered as at 51 and adapted to be received on a tapered opening 52 formed on a member 53, the latter constituting one of the elements of the vehicle steering mechanism. The member 53 being retained on the stud by means of a nut 55 engageable with the threaded end 56 of the ball stud and locked in position by a cotter pin 57. The stud chamber 16 of the housing 10 is closed at the end adjacent to flange 17 by means of a gasket or resilient washer 60 of suitable material. The washer 60 is held against undue distortion by means of a metallic cup like member 61 and through the medium of spring member 73 interposed between member 53 and cup like member 61 the resilient washer 60 is held in close contact with the walls of the housing 10. This arrangement prevents the ingress of dirty water or foreign matter which would be detrimental to the proper operation of the joint.

In order to supply lubricant to the chamber 16 a suitable opening 75 communicating therewith is formed on the side wall of the housing 10 to which is threaded a lubricant receiving fitting 76 so as to permit the ingress of a suitable lubricant to the interior of the joint.

It should be noted that due to the arrangement and position of the bearing members 21 and 22 with respect to the ball stud and curved sections of the chamber 16 and the cooperating relationship and action of the resilient member 35 with respect to these elements, there is at all times the proper degree of friction between the contacting surfaces constituting the ball and socket elements thus insuring proper functioning of the entire joint under all operating conditions.

It is apparent that, within the scope of the invention, modifications and different arrangements may be made other than is herein disclosed, and the present disclosure is illustrative merely, the invention comprehending all variations thereof.

What I claim is:

1. In combination a member having a chamber the walls of which are of the contour of a plurality of cylindrical sections; a ball shaped member positioned within said chamber having a stem projecting therefrom; a plurality of annular bearing members interposed between said chamber walls and said ball shaped member; one of said bearing members having an inner surface curved for embracing a portion of said ball shaped member and having its outer surface circumferentially curved eccentrically with respect to the center of curvature of the inner surface; and resilient means located in said chamber acting on the eccentrically curved bearing member for moving the same to wedgedly engage said ball shaped member.

2. In combination a member having a chamber formed of a plurality of curved sections; a ball shaped member positioned within said chamber having a stem projecting therefrom; a plurality of annular bearing members interposed between the chamber walls and said ball shaped member; one of said bearing members having an inner surface curved for embracing a portion of said ball shaped member and having its outer surface curved eccentrically with respect to the center of curvature of the inner surface; and a torsional member connected to the eccentrically curved bearing member for wedgedly engaging said ball shaped member and take up wear.

3. In combination, a member having a chamber; a ball shaped element positioned within said chamber and having a stem projecting therefrom; means in said chamber for limiting the extent of movement of said element in a direction of said stem; an annular bearing member interposed between said chamber wall and the ball shaped element, said bearing member having an inner surface curved for embracing a portion of said ball shaped element and having its outer surface circumferentially curved eccentrically with respect to the center of curvature of said inner surface; and resilient means located in said chamber acting upon the eccentrically curved annular member for moving the same to wedgingly engage said ball shaped element.

WILLIAM A. FLUMERFELT.